Nov. 10, 1936.   C. A. ARNOLD   2,060,652
SAND SPREADER
Filed Nov. 27, 1934   2 Sheets-Sheet 1

INVENTOR
CHARLES A. ARNOLD
BY *John A. Hanrahan*
ATTORNEY

Nov. 10, 1936.     C. A. ARNOLD     2,060,652
SAND SPREADER
Filed Nov. 27, 1934     2 Sheets-Sheet 2

INVENTOR
CHARLES A. ARNOLD
BY John A. Hanrahan
ATTORNEY

Patented Nov. 10, 1936

2,060,652

UNITED STATES PATENT OFFICE 2,060,652

SAND SPREADER

Charles A. Arnold, West Haven, Conn.

Application November 27, 1934, Serial No. 755,021

28 Claims. (Cl. 275—8)

This invention relates to new and useful improvements in road working equipment and has particular relation to a sand spreader.

An object of the invention is to provide a means whereby sand may be rapidly and evenly and without manual effort spread or distributed over the travelled portion of a highway and the shoulders thereof or over the travelled portion of the highway and not the shoulders thereof or over the shoulders and not the travelled portions of the highway.

Another object is to provide an apparatus having the characteristics indicated and which comprises an automobile truck on which the sand to be distributed is carried and on which is mounted the distributing apparatus, means being provided whereby the distributing apparatus is driven by the power plant which drives the truck and in desired timed relationship to the speed of the truck and means being also provided whereby the sand may be distributed on either or both sides of a highway and on either or both shoulders of the highway or on one side and one shoulder of the highway.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

Figure 1:
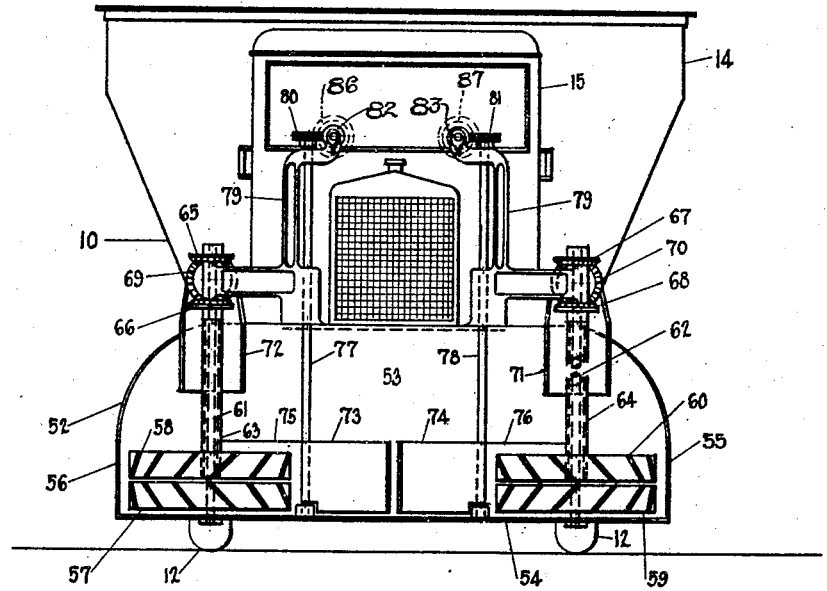
Fig. 1 is a front elevational view of an apparatus constructed in accordance with the present invention.

Referring in detail to the drawings, at 10 is generally indicated a truck including a frame 11, front wheels 12 and rear or driving wheels 13. On the frame 11 is mounted a body 14 which may be of desired construction but which is shown in the form of a hopper and forwardly of said body 14 is the cab 15 within which is the driver's seat 16 and the controls for the various parts are arranged for manipulation from the driver's seat. An engine (not shown) is as usual mounted by the frame 11 and through a shaft 17 and any or the usual transmission (not shown) and differential (not shown) serves to drive the wheels 13 of the truck. Any of the usual controls (not shown) may form part of the truck but since these controls are standard equipment and to avoid confusion they have not been illustrated.

Figure 2:
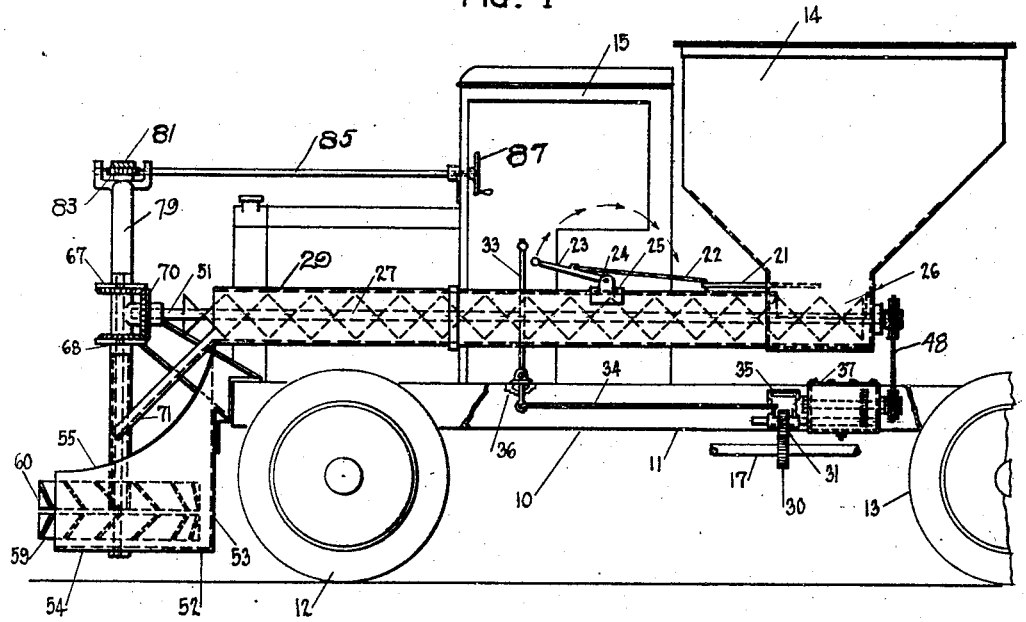
Fig. 2 is a side elevational view thereof, a part of the truck frame being broken away.

In its bottom wall adjacent its sides the body 14 is provided with openings 18 and 19 which openings may be partially or completely closed as desired on proper manipulation of the slides or valves 20 and 21 respectively. To each of the slides there is connected a link 22 passing forwardly of the body 14, at the respective sides of the cab 15, and at its forward end pivotally connected with a lever 23 intermediate the ends of the latter. The lower end of the lever 23 is pivotally connected as at 24 to a bracket 25 and it will be apparent that on swinging the lever 23 in the manner suggested by the arrows in Fig. 2, the valve to which said lever is attached by the link 22 will be moved to close an opening in the bottom of body 14. It will be understood that the link 22 and lever 23 combine to form a toggle whereby the valves 20 and 21 will be held in fully open or fully closed position when the levers 23 are swung to their extreme position in either direction.

The valves 20 and 21 are adapted to be opened to permit sand to pass from the interior of the body 14 to receptacles or pockets 26 formed beneath each of the openings controlled by the valves. Screw conveyors 27 and 28 are arranged one at each side of the truck and are suitably mounted on the same and such conveyors operate within tubes 29. The rear end portion of each conveyor enters one of the pockets or compartments 26 at its side of the truck whereby when the valves 20 and 21 are opened sand passing through the openings 18 and 19 will be picked up by the conveyors 28 and 27 and carried toward the front of the truck, if such conveyors are in operation.

Means are provided for driving the conveyors 27 and 28 from the drive shaft 17 of the truck and to this end a gear 30 is mounted on such drive shaft and is adapted to mesh with and drive a gear 31 on a shaft 32 when such gear 31 is shifted to operative position. Shifting of gear 31 is accomplished by means of a lever 33 acting through a link 34 connected at its forward end to the lower end of said lever and at its rear end to a slide or yoke 35. A quadrant 36 associated with the lever 33 serves to lock the same in position so as to secure the gear 31 in mesh with the gear 30 or to secure the gear 31 in position out of mesh with said gear 30.

Shaft 32 passes into a casing 37 and within said casing carries a gear 38 meshing with and driving gears 39 and 40 on shafts 41 and 42 respectively. Gear 40 also meshes with and drives a gear 43 on a shaft 44. Shafts 41 and 44 project through the rear wall of the casing 37 and on their rear end portion these shafts carry sprocket wheels 45 and 46 over which are trained chains 47 and 48. These chains are also trained over sprockets 49 and 50 respectively and such sprockets are on the ends of the shafts 50 and 51 of the screw conveyors 28 and 27 respectively. By the means described it will be clear that on proper manipulation of the lever 33 the screw conveyors may be coupled or uncoupled with the drive shaft 17 so that said conveyors will be driven or not as required.

Across the lower portion of the front of the truck there is arranged an apron 52 including a rear wall 53, a bottom wall 54 and end walls 55 and 56. In each end portion of the apron 52 there are arranged sand distributing wheels 57, 58, 59 and 60. While these wheels are arranged in pairs, each wheel is here given a separate number for the purpose of simplifying the description to follow. The wheels 57 and 59 are arranged lowermost and immediately above the bottom wall 54 of the apron and these wheels are secured to the lower end portion of similar shafts 61 and 62. About such shafts are hollow or tubular shafts 63 and 64 to which are secured the wheels 58 and 60 respectively.

It will be understood that the spreader wheels are thus mounted for rotation independent of one another and to the upper end of the shaft 61 there is secured a bevelled gear 65 while an oppositely facing bevelled gear 66 is secured to the upper end of the tubular shaft 63. Similarly, a bevelled gear 67 is secured to the upper end of shaft 62 and an oppositely facing bevelled gear 68 is secured to the upper end of the tubular shaft 64. On the forward end of the shaft 50 of the screw conveyor 28 there is a bevelled gear 69 meshing with both of the bevelled gears 65 and 66. On the forward end of the shaft 51 of the screw conveyor 27 there is a bevelled gear 70 meshing with both of the bevelled gears 67 and 68.

Owing to the arrangement of the gears in the casing 37 the conveyors 27 and 28 are driven in opposite directions and owing to the gear arrangement between the forward ends of said conveyors and the distributing wheels it will be understood that the wheels 57 and 59 are rotated in opposite directions and that the wheels 58 and 60 are rotated in opposite directions and that the wheels 57 and 58 are rotated in opposite directions as are the wheels 59 and 60. When the valves or slides 20 and 21 are open and sand is being moved by the conveyors 27 and 28 the latter discharge onto chutes or slides 71 and 72 respectively and the latter discharge the sand close to the centers of the spreader wheels.

Associated with the wheel 57 is a gate 73 and a similar gate 74 is associated with the wheel 59. These gates form movable extensions of curved baffles 75 and 76 respectively and the gate 73 is secured to a rotatable rod 77 while the gate 74 is secured to a similar rod 78. These rods 77 and 78 have bearings in brackets 79 and the rods are arranged vertically and the gates are secured to the lower end portions of the rods while to the upper end portion thereof there are secured worm wheels 80 and 81 respectively. Meshing with such worm wheels are worms 82 and 83 secured to the forward ends of shafts 84 and 85. Such shafts extend into the cab 15 and on the inner end of shaft 84 is a hand wheel 86 and a similar hand wheel 87 is secured to the inner end of shaft 85. On proper manipulation of the hand wheels 86 and 87 the vertical shafts or rods 77 and 78 will be turned to carry the gates 73 and 74 toward or from the distributing wheels with which such gates are associated.

In the operation of the apparatus, assuming that the body 14 is loaded with sand and that the truck 10 has been driven to the place where the sand is to be distributed the operator manipulates either one or both of the levers 23 to open either or both of the valves 20 and 21 as desired. If both valves are open sand will pass into both of the compartments 26 and be available to both of the spiral conveyors. Next, lever 33 is shifted to place the gear 31 in mesh with the gear 30 and assuming that the vehicle is in motion this will result in the conveyors being driven and the conveyors will drive the distributing wheels 57 through 60 as above explained. Valves 20 and 21 being opened and gear 31 being in mesh with gear 30 all of the apparatus will be in operation and the sand fed to the wheels 57 through 60 will be distributed.

Assuming that the gates 73 and 74 are both open as shown in Fig. 1, a portion of the sand dropping from the chute 71 will be thrown toward the outer or left hand side of the road by the wheel 60 as viewed from the driver's position in the cab 15, and the remaining portion of the sand discharged by chute 71 will be thrown toward the center of the road by the wheel 59. A portion of the sand discharged by the chute 72 will be thrown toward the right of the road by the wheel 58 and the remaining portion of such sand will be thrown toward the center of the road by the wheel 57. From this it will be clear that when sand is being distributed by the four distributing wheels 57 through 60 a wide layer of sand is placed.

Should it be desired to cover only one half of the travelled portion of the road and one shoulder of the road, one of the valves 20 or 21 will be closed so that the distributing wheels fed by the conveyor associated with such valve will not receive sand. For example, assuming that it is desired that the apparatus spread sand on the right hand portion of the road and on the right shoulder as the apparatus progresses along then it is but necessary to close the valve 21. When this has been done no sand will reach the conveyor 27 and consequently no sand will be distributed by the wheels 59 and 60. If the opposite portion of the road is to be sanded then the valve 20 would be closed and the valve 21 left open.

Figure 3:
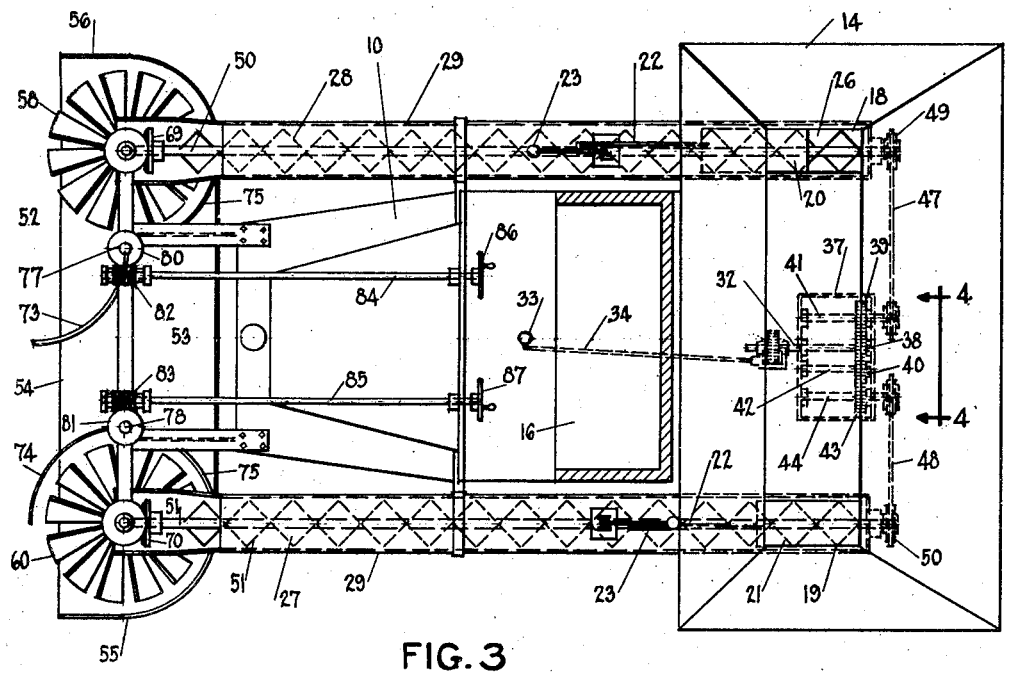
Fig. 3 is a top plan view of the complete apparatus, the top of the truck cab being omitted.
Figure 4:
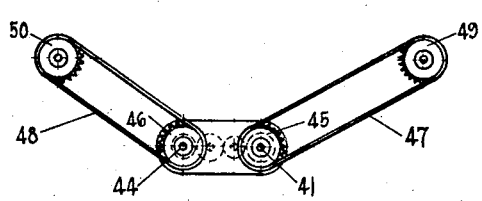
Fig. 4 is a detail elevational view illustrating a drive employed, the view being taken substantially along the line 4—4 of Fig. 3.
Figure 6:
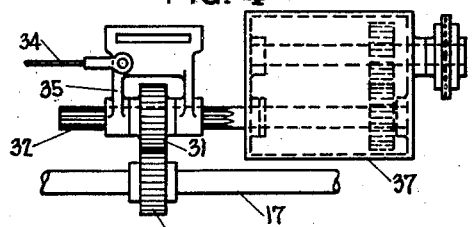
Fig. 6 is a view illustrating the power take-off.
Figure 5:
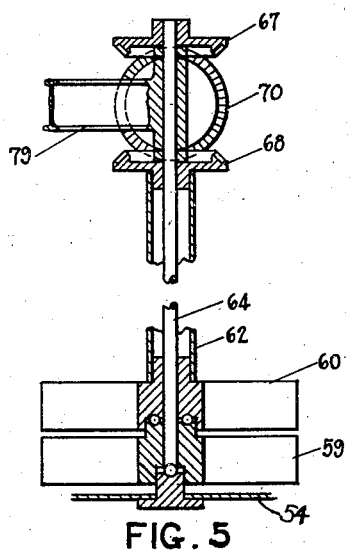
Fig. 5 is a detail sectional view on an enlarged scale showing the drive for the spreader wheels.

When it is desired to sand only the shoulders of a road, as when such shoulders have just been oiled the hand wheels 86 and 87 are operated to move the gates 73 and 74 to closed positions and when such gates are in closed positions they are related to the distributing wheels with which they are associated as the gate 74 in Fig. 3 is related to the wheels 59 and 60. When the gates are so closed the wheels 57 and 59 may not throw sand to the center of the road. If it is desired, to sand but one shoulder of the road, as, for example, the shoulder to the right of the direction in which the truck is travelling then the valve 21 is closed and the gate 73 is also closed. With the parts so positioned, sand will not be fed to the wheels 59 and 60 and the gate 73 will block the sand thrown by the distributing wheel 57.

During the time the truck is being delivered to and from the place where the sand is to be distributed the valves 20 and 21 should both be closed and the gear 31 should be out of mesh with the gear 30. When the point of distribution is reached, the control levers 23 may be conveniently operated and the control lever 33 is within the cab to be operated from the driver's seat and the hand wheels for controlling the gates are also so positioned that they may be operated from the driver's seat.

The present apparatus does not substantially increase the over all length of the truck and is compactly arranged and enclosed and does not require a separate power plant for its operation. The apparatus is capable of spreading sand evenly and over any desired path or a path of the desired width and the sand is spread and distributed with a rapidity depending on the speed at which the truck is driven. This is true since the apparatus is driven from the drive shaft of the truck and at a speed dependent upon the speed of such shaft.

Since the sand is distributed ahead of the truck the apparatus is useful for sanding icy roads since the sand as placed will serve to give traction to the driving wheels of the truck as they progress along. Further, the apparatus may be used to follow an oil distributing truck and cover the newly placed oil whether it be on either or both shoulders of the road or on either or both sides of the travel portion of the road or on both of the shoulders and both sides of the travelled portion of the road. As the truck is brought to a stop from time to time the apparatus is stopped as the truck stops or its clutch is disconnected or as the lever 33 is shifted to move gear 31 from gear 30.

While the word "sand" is repeatedly used in the foregoing description and the following claims to describe the material acted on by the present apparatus, it will be understood that this is by way of example or illustration. Obviously, the apparatus may be used to spread other materials as gravel, crushed rock, salt, etc. and it is therefore to be understood that I do not limit myself to the use of the apparatus for the spreading of any particular material and that the word "sand" is used only as one example of the material which may be spread by the present apparatus. Therefore, I claim the apparatus for the spreading of material irrespective of any particular material and intend that the word "sand" as used in the specification and claims cover other material likely to be spread by the disclosed apparatus.

Having thus set forth the nature of my invention, what I claim is:

1. In a sand spreader, an automobile truck including a body to receive and carry sand, a pair of conveyors on and arranged one at each side of the truck, valve means controlling passage of sand from the body to the conveyors, means for driving said conveyors from a moving part of the truck, substantially horizontally arranged sand spreading wheels at the forward end of the truck, said wheels spaced apart and each arranged to receive sand from one of the conveyors, and means for driving said wheels in opposite directions.

2. In a sand spreader, an automobile truck including a body to receive and carry sand, a conveyor supported on the truck and extending longitudinally thereof and adapted to receive sand from said body, means for driving said conveyor from a moving part of the truck, a sand spreading means at the forward end of the truck and arranged to receive sand from said conveyor, said means including blades to strike the sand and throw it outwardly, a vertical shaft mounting said blades, and means for rotating said shaft whereby as said blades strike the sand they throw it both forwardly of the truck and laterally of its path of travel.

3. In a sand spreader, an automobile truck including a body to receive and carry sand, a conveyor supported on the truck and extending longitudinally thereof and adapted to receive sand from said body, manually shiftable means for establishing a driving connection between the conveyor and a moving part of the truck, a sand spreading wheel at the forward end of the truck and arranged to receive sand from the conveyor, a vertically disposed shaft mounting said wheel, and means for driving said shaft whereby as said wheel is rotated it spreads sand both forwardly of the truck and laterally of its path of travel.

4. In a sand spreader, an automobile truck including a body to receive and carry sand, a conveyor supported on the truck and extending longitudinally thereof and adapted to receive sand from said body, manually shiftable means for establishing a driving connection between the conveyor and a moving part of the truck, a sand spreading wheel at the forward end of the truck and arranged to receive sand from the conveyor, and a driving connection between the conveyor and wheel whereby the latter is rotated by the former while the former is in operation.

5. In a sand spreader, an auomobile truck including a body to receive and carry sand, a conveyor supported on the truck and extending longitudinally thereof and adapted to receive sand from said body, a manually operable valve controlling passage of sand from the body to the conveyor, means at the exterior of said body for operating said valve, means for driving said conveyor from a moving part of the truck, a sand spreading means at the forward end of the truck and arranged to receive sand from said conveyor, said means including blades to strike the sand and throw it outwardly, and means for rotating said blades.

6. In a sand spreader, an automobile truck including a cab and a body to receive and carry sand, a conveyor supported on the truck and extending longitudinally thereof and adapted to receive sand from said body, a horizontally slidable valve controlling passage of sand from the body to the conveyor, a reciprocable rod operable from the truck cab to slide said valve to and from a position preventing passage of sand from the body to the conveyor, means for driving said conveyor from a moving part of the truck, a sand spreading wheel at the forward end of the truck and arranged to receive sand from said conveyor, and means for rotating said wheel.

7. In a sand spreader, an automobile truck including a body to receive and carry sand, a conveyor supported on the truck and extending longitudinally thereof and adapted to receive sand from said body, means for driving said conveyor from a moving part of the truck, a sand spreading wheel at the forward end of the truck and arranged to receive sand from said conveyor, and means for rotating said wheel from the conveyor.

8. In a sand spreader, an automobile truck including a body to receive and carry sand, a pair of conveyors supported on and extending longitudinally of and arranged one at each side of the truck to receive sand from said body, valve means controlling passage of sand from the body to the conveyors, means for driving said conveyors from a moving part of the truck, two pairs of substantially horizontal spreading wheels at one end of the truck and arranged one pair toward each side of the truck to receive sand from the respective conveyors, and means to drive the wheels of the pairs in opposite directions.

9. In a sand spreader, an automobile truck including a body to receive and carry sand, a pair of conveyors supported on and extending longitudinally of and arranged one at each side of the truck to receive sand from said body, valve means controlling passage of sand from the body to the conveyors, means for driving said conveyors from a moving part of the truck, two pairs of substantially horizontal spreading wheels at one end of the truck and arranged one pair toward each side of the truck to receive sand from the respective conveyors, and means to drive the wheels of the pairs in opposite directions from a moving part of the truck.

10. In a sand spreader, an automobile truck including a body to receive and carry sand, a pair of conveyors supported on and extending longitudinally of and arranged one at each side of the truck to receive sand from said body, independent valves controlling the passage of sand from the truck body to the respective conveyors, means for driving said conveyors from a moving part of the truck, two pairs of spreading wheels at one end of the truck and arranged one pair toward each side of the truck to receive sand from the respective conveyors, and means to drive the wheels of the pairs in opposite directions.

11. In a sand spreader, an automobile truck including a body to receive and carry sand, a pair of conveyors supported on and extending longitudinally of and arranged one at each side of the truck to receive sand from said body, valve means controlling passage of sand from the body to the conveyors, means for driving said conveyors from a moving part of the truck, two pairs of substantially horizontal spreading wheels at one end of the truck and arranged one pair toward each side of the truck to receive sand from the respective conveyors, means to drive the wheels of the pairs in opposite directions, and said means including driving connections between the wheels and conveyors at the same sides of the trucks.

12. In a sand spreader, an automobile truck including a body to receive and carry sand, a pair of conveyors supported on and extending longitudinally of and arranged one at each side of the truck to receive sand from said body, valve means controlling passage of sand from the body to the conveyors, means for driving said conveyors in opposite directions from a moving part of the truck, two pairs of substantially horizontal spreading wheels at one end of the truck and arranged one pair toward each side of the truck to receive sand from the respective conveyors, means to drive the wheels of the pairs in opposite directions, and said means including driving connections between the wheels and conveyors at the same sides of the truck.

13. In a sand spreader, an automobile truck including a body to receive and carry sand, a pair of conveyors supported on and extending longitudinally of and arranged one at each side of the truck to receive sand from said body, valve means controlling passage of sand from the body to the conveyors, means for driving said conveyors from a moving part of the truck, two pairs of substantially horizontal spreading wheels at one end of the truck and arranged one pair toward each side of the truck to receive sand from the respective conveyors, means to drive the wheels of the pairs in opposite directions, a movable gate associated with each of said pairs of wheels, and means for moving said gates to and from positions blocking the throw of sand by one wheel of each of said pairs of wheels.

14. In a sand spreader, an automobile truck including a body to receive and carry sand, a pair of conveyors supported on and extending longitudinally of and arranged one at each side of the truck to receive sand from said body, valve means controlling passage of sand from the body to the conveyors, means for driving said conveyors from a moving part of the truck, two pairs of substantially horizontal spreading wheels at one end of the truck and arranged one pair toward each side of the truck to receive sand from the respective conveyors, means to drive the wheels of the pairs in opposite directions, a movable gate associated with each of said pairs of wheels, and means operable from the truck cab for moving said gates to and from positions blocking the throw of sand by one wheel of each of said pairs of wheels.

15. In a sand spreader, an automobile truck including a body to receive and carry sand, a pair of conveyors supported on and extending longitudinally of and arranged one at each side of the truck to receive sand from said body, valve means controlling passage of sand from the body to the conveyors, means for driving said conveyors from a moving part of the truck, two pairs of substantially horizontal spreading wheels at one end of the truck and arranged one pair toward each side of the truck to receive sand from the respective conveyors, means to drive the wheels of the pairs in opposite directions, a movable gate associated with each of said pairs of wheels, and means for independently moving said gates to and from positions blocking the throw of sand by one wheel of each of said pairs of wheels.

16. In a sand spreader, an automobile truck including a body to receive and carry sand, a pair of conveyors supported on and extending longitudinally of and arranged one at each side of the truck to receive sand from said body, valve means controlling passage of sand from the body to the conveyors, means for driving said conveyors from a moving part of the truck, two pairs of substantially horizontal spreading wheels at one end of the truck and arranged one pair toward each side of the truck to receive sand from the respective conveyors, means to drive the wheels of the pairs in opposite directions, a movable gate associated with each of said pairs of wheels, and means operable from the truck cab for independently moving said gates to and from positions blocking the throw of sand by one wheel of each of said pairs of wheels.

17. In a sand spreader, an automobile truck, a pair of substantially horizontal spreading wheels at one end of the truck and arranged one toward each side thereof, means for feeding sand to said wheels, and means for rotating said wheels in opposite directions to throw sand laterally of the path of movement of the truck.

18. In a sand spreader, an automobile truck, a pair of substantially horizontal spreading wheels at one end of the truck and arranged one toward each side thereof, means for feeding sand to said wheels, means for rotating said wheels in opposite directions to throw sand laterally of the path of movement of the truck, and means movable to and from a position preventing sand from one wheel moving toward the other wheel.

19. In a sand spreader, a wheeled vehicle, two pairs of spreading wheels at one end of the vehicle and arranged one pair toward each side thereof, means for supplying sand to said wheels, and means to drive the wheels of the pairs in opposite directions.

20. In a sand spreader, an automobile truck, two pairs of spreading wheels at one end of the truck and arranged one pair toward each side thereof, a pair of conveyors arranged each to deliver sand to one pair of said wheels, means for driving said conveyors from a moving part of the truck, means to drive the wheels of said pairs in opposite directions, and said last means including driving connections between the wheels and the conveyors.

21. In a sand spreader, an automobile truck, two pairs of spreading wheels at one end of the truck and arranged one pair toward each side thereof, a pair of screw conveyors arranged each to deliver sand to one pair of said wheels, means for rotating said conveyors in opposite directions from a moving part of the truck, means to drive the wheels of said pairs in opposite directions, and said last means including driving connections between the wheels and the conveyors.

22. In a sand spreader, a wheeled vehicle, two pairs of spreading wheels at one end of the vehicle and arranged one pair toward each side thereof, means for supplying sand to said wheels, means to drive the wheels of the pairs in opposite directions, a movable gate associated with one of said pairs of wheels, and means for moving said gate to and from a position blocking the throw of sand by one wheel of said pair of wheels.

23. In a sand spreader, a wheeled vehicle, two pairs of spreading wheels at one end of the vehicle and arranged one pair toward each side thereof, means for supplying sand to said wheels, means to drive the wheels of the pairs in opposite directions, a movable gate associated with each of the pairs of wheels, and means for independently moving said gates to and from positions blocking the throw of sand by one wheel of each of said pairs of wheels.

24. In a sand spreader, a wheeled vehicle, two pairs of spreading wheels at one end of the vehicle and arranged one pair toward each side thereof, means for supplying sand to said wheels, means to drive the wheels of the pairs in opposite directions, and means whereby the feeding of sand to one of said pairs of wheels may be prevented without interfering with the feeding to and the spreading of sand by the other pair of wheels.

25. In a sand spreader, an automobile truck, a pair of spreading wheels at one end of the truck and arranged one toward each side thereof, independent conveyors for feeding sand to the respective wheels, means for rotating said wheels to throw sand laterally of the path of movement of the truck, and means to discontinue the feed of sand by one of said conveyors without interfering with the feed of sand by the other conveyor whereby sand will be thrown by only one of said wheels.

26. In a sand spreader, a wheeled vehicle, two pairs of spreading wheels at one end of the vehicle and arranged one pair toward each side thereof, independent means for supplying sand to the respective pairs of wheels, means to drive the wheels of the pairs in opposite directions, and means to discontinue the feed of sand by one of said feed means without interfering with the operation of the other thereof whereby sand will be thrown by only one pair of said wheels.

27. In a sand spreader, a wheeled vehicle including a driver's seat, a pair of concentric spreading wheels at one end of the vehicle, means for supplying sand to said wheels, means for rotating said wheels in opposite directions, a gate movable to and from a position to block sand thrown by one of said wheels, and means operable from the driver's seat for moving said gate.

28. In a sand spreader, an automobile truck including a cab and a body to receive and carry sand, a conveyor supported on the truck and extending longitudinally thereof and adapted to receive sand from said body, a slidable valve controlling passage of sand from the body to the conveyor, a horizontally reciprocable rod operable from the truck cab to slide said valve to and from a position preventing passage of sand from the body to the conveyor, means for driving said conveyor, a sand spreading wheel at the forward end of the truck and arranged to receive sand from said conveyor, and means for rotating said wheel.

CHARLES A. ARNOLD.